United States Patent [19]

Hoag et al.

[11] Patent Number: 5,109,605

[45] Date of Patent: May 5, 1992

[54] MAKING A FRACTURED POWDER METAL CONNECTING ROD

[75] Inventors: Peter Y. Hoag, Milford; David A. Yeager, Plymouth, both of Mich.

[73] Assignee: Ford Motor Company, Dearborn, Mich.

[21] Appl. No.: 640,739

[22] Filed: Jan. 14, 1991

Related U.S. Application Data

[62] Division of Ser. No. 194,750, May 17, 1988, Pat. No. 4,993,134.

[51] Int. Cl.⁵ .............................................. B23P 15/10
[52] U.S. Cl. ............................. 29/888.09; 29/888.092; 74/579 E
[58] Field of Search ...................... 29/888.09, 888.092; 74/579 E

[56] References Cited

U.S. PATENT DOCUMENTS

| | | | |
|---|---|---|---|
| 2,553,935 | 5/1951 | Parks et al. | 29/888.09 X |
| 3,818,577 | 6/1974 | Bailey et al. | 29/888.09 X |
| 3,994,054 | 11/1976 | Cuddon-Fletcher et al. | 29/888.09 |
| 4,569,109 | 2/1986 | Fetouh | 29/888.09 |
| 4,688,446 | 8/1987 | Ishikawa | 29/888.09 X |
| 4,693,139 | 9/1987 | Mukai et al. | 29/888.09 X |
| 4,860,419 | 8/1989 | Hekman | 29/888.09 |
| 4,936,163 | 6/1990 | Hoag et al. | 29/888.09 X |
| 4,993,134 | 2/1991 | Hoag et al. | 29/888.09 X |

FOREIGN PATENT DOCUMENTS 0205238 11/1984 Japan .................... 29/888.09

Primary Examiner—Timothy V. Eley
Assistant Examiner—C. Richard Martin
Attorney, Agent, or Firm—Joseph W. Malleck; Clifford L. Sadler

[57] ABSTRACT

A method of making a connecting rod for attachment to a bearing journal by separation of parts of the connecting rod, comprising: (a) forging a powder metal sintered preform to provide a one-piece connecting rod having an annular wall defining a crank opening with a center axis and with stress risers for establishing a cracking plane that extends across said crank opening; (b) providing access for a compression coupling across the cracking plane; (c) while at ambient conditions, applying tension substantially uniformly across the cracking plane to propagate fracture from the stress risers along said cracking plane and thereby separate the connecting rod into a cap and body with cracked surfaces; and (d) remating the cap and body by applying a compression coupling through the access to draw said cap and body together under guidance and with metal yielding pressure to effect substantially an exact rematch of said cracked surfaces. Control of the diametrical clearance between the bolt shanks and the bolt openings, of the bolts used as the compression coupling, promotes guidance needed to achieve such rematch. The cracking is effected in an improved manner by use of continuous pulling apart of the rod in a direction perpendicular to the cracking plane.

6 Claims, 6 Drawing Sheets

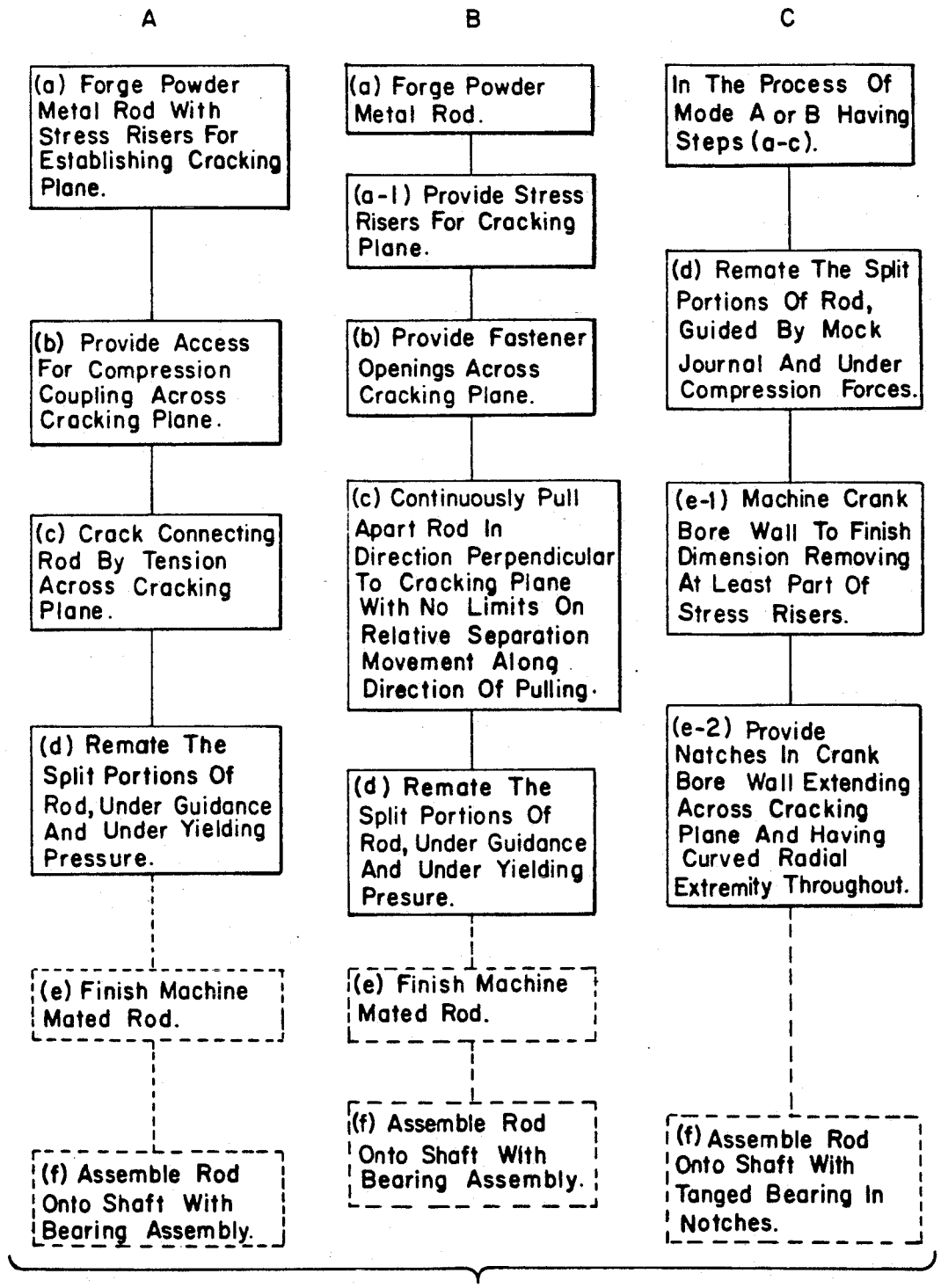

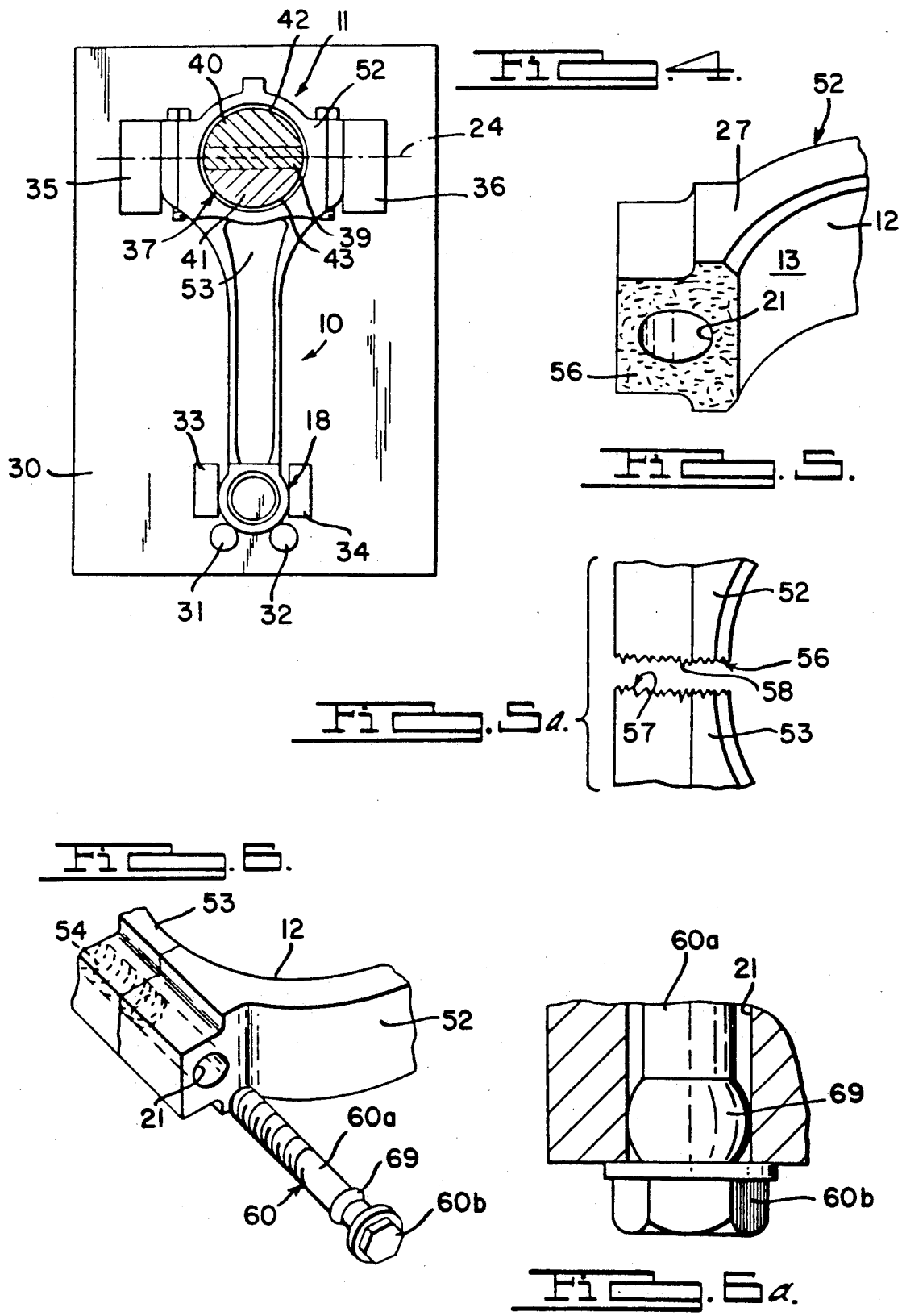

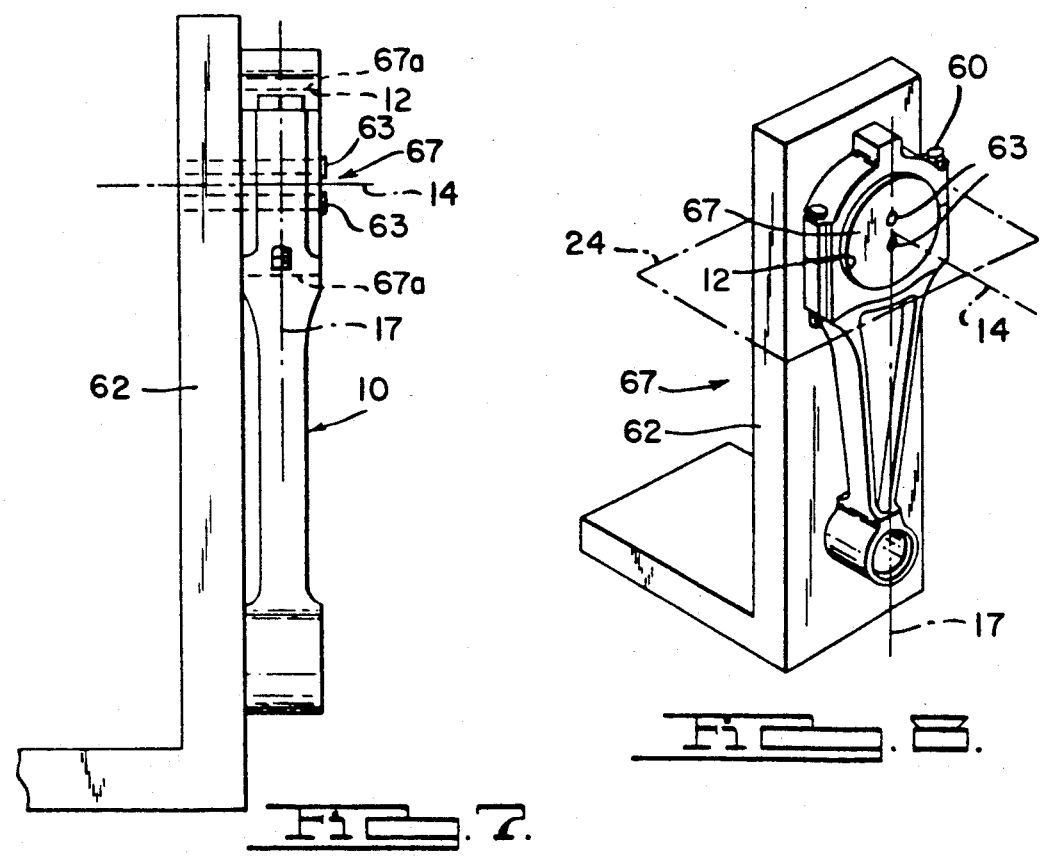
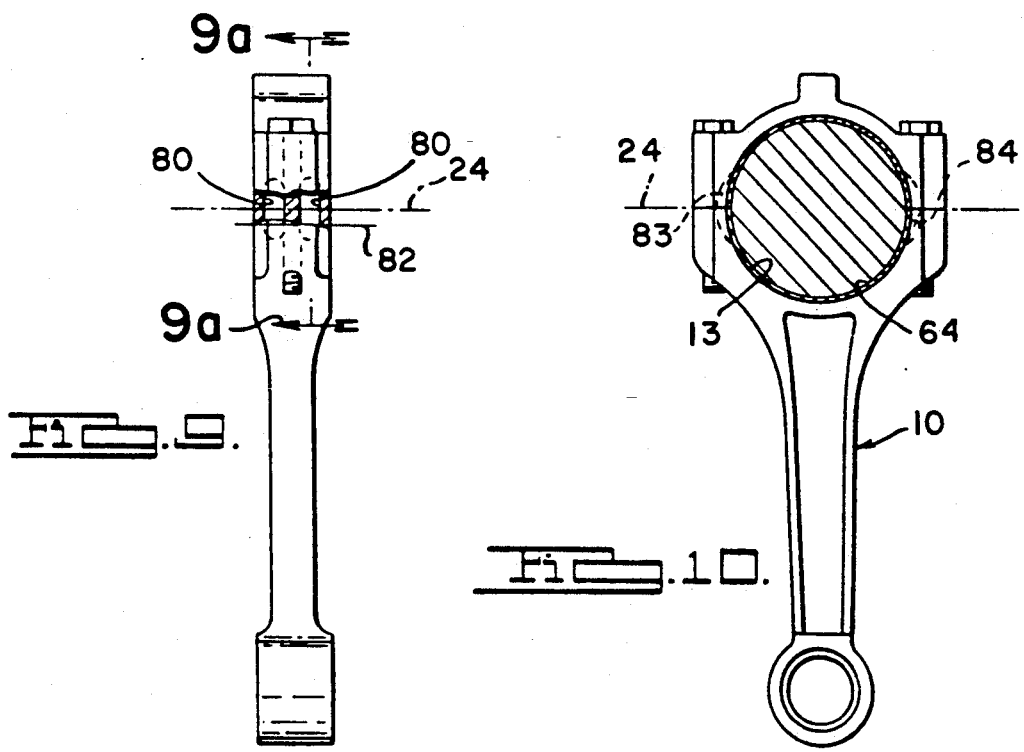

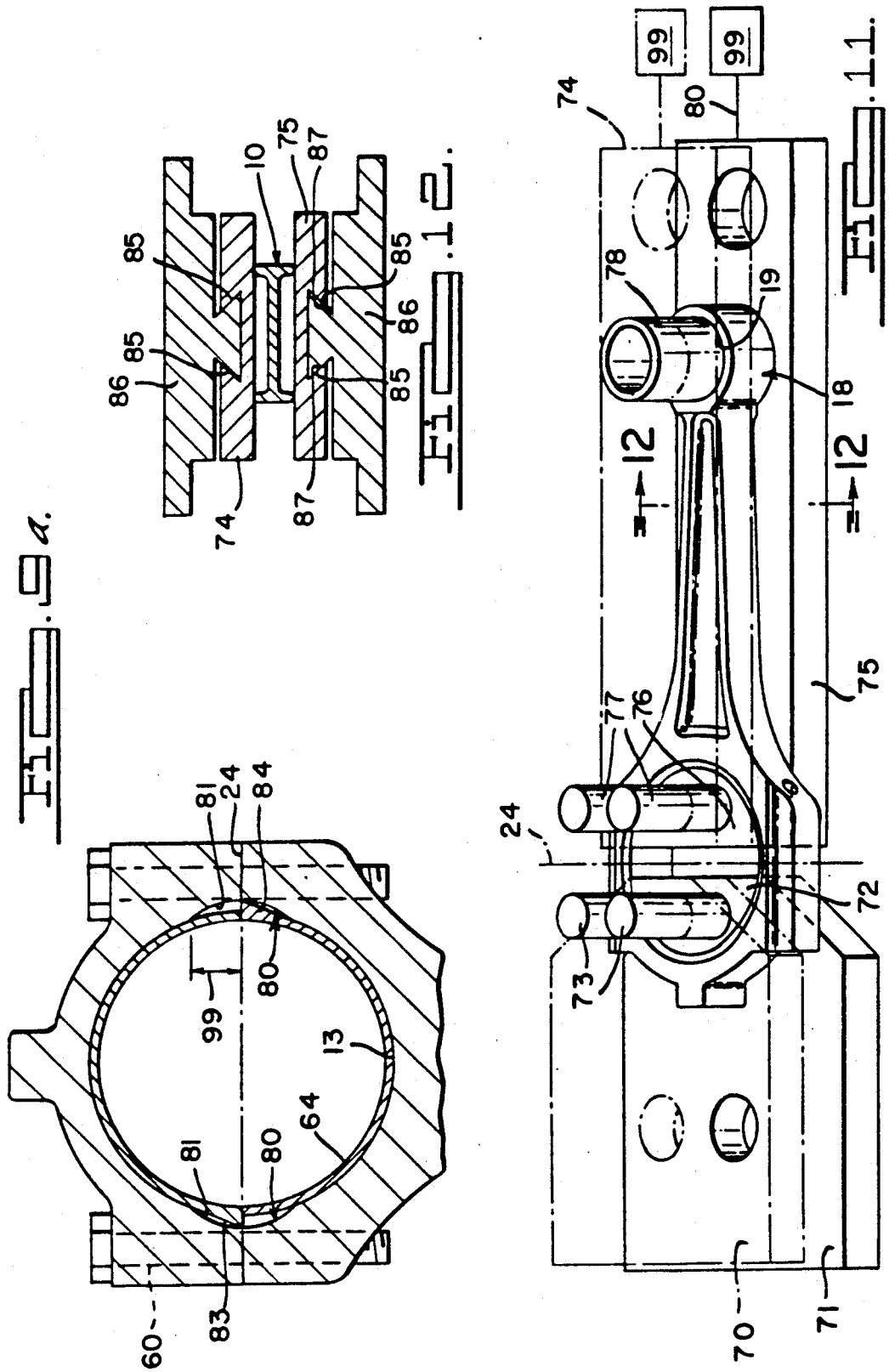

MAKING A FRACTURED POWDER METAL CONNECTING ROD

This is a division of application Ser. No. 07/194,750, filed May 17, 1988, now U.S. Pat. No. 4,993,134.

BACKGROUND OF THE INVENTION

1. Technical Field

This invention relates to the art of making annular bearing assemblies with separable journalizing parts that permit reception of a shaft other than along an axial direction of the bearing; and, more particularly, it relates to the art of making split connecting rods for use in automotive internal combustion engines.

2. Description of the Prior Art

Automotive connecting rods usually have one end that forms part of an annular bearing assembly requiring separable cap and body portions to permit insertion of a complex configured crankshaft from a direction *not* along the axis of the bearing. A simple pin bearing assembly at the opposite end of the connecting rod usually attaches the rod to a piston; the simplicity of this attachment allows the pin to be received along the axis of the bearing.

The advent of more compact engines delivering higher horsepower at increasingly higher rpm's has placed increased stress on the connecting rod and its bearings. The bipartite rod should act as a unitary piece to transfer dynamic forces with better bearing life. To meet this challenge, the manufacture of automotive connecting rods has undergone evolutionary changes.

Connecting rods were originally made by separately casting or forging attachable cap and body portions. These parts were usually made of high carbon wrought steel and were separately machined at both joining faces and thrust faces; they were then separately with holes to accept fasteners. A first evolutionary step was to cast or forge the connecting rod as a single steel piece, followed by the drilling of holes to accept fasteners. The single piece was sawed to obtain cap and body portions which were separately rough-machined at the thrust and contacting surfaces; the two portions were then bolted together for finish-machining. The separate steps of machining *and* sawing were not only cumbersome and expensive, but they also did not ensure a perfectly matched cap and body under all operating forces. The bolts cannot ensure perfect doweling of the cap and body portions upon bolting together because of some diametrical clearance existing between the unthreaded bolt shank and the opening through which it extends. The bolts were torqued to apply compression forces that would prevent relative movement between the portions. Unfortunately, under some operating conditions, this inherent fastener clearance may permit slight microshifting of the cap and body portions which may affect bearing life.

As the next step in this evolutionary change, a single-piece connecting rod was split into its mating cap and body portions with an undulating interface in the hope of providing nonsliding surfaces where the cap and body portions are bolted together. If such surfaces were properly remated, the remate should prevent microshifting and assure more accurate operating alignment.

To split the single piece into two, it was initially struck on one side with a sharp blow. This met with little success because of the uncontrollability of the cracking plane and possible damage to the connecting rod. An early attempt at nonimpact splitting was accomplished by fracturing the big end of the connecting rods with a wedge-expandable mandrel placed in the crank bore opening (see U.S. Pat. No. 2,553,935). All finish machining was conducted on the one-piece connecting rod before fracturing. Even though the rod was made of a strong, nonbrittle, high carbon wrought steel, fracturing was carried out at room temperature. Brittleness across the cracking plane was achieved by cutting deep radial reductions at the crack plane—by sawing, milling, and drilling, or combination of all three—to significantly reduce the crackable section. Such connecting rods were intended for light duty applications such as small outboard marine engines and lawnmowers.

Another approach to splitting was disclosed in U.S. Pat. No. 3,751,080, which recognized the difficulty of fracturing strong high carbon steels at room temperature when they were formed in large sizes adequate for automotive engine applications. An electron beam was moved along a desired splitting plane in an undulating fashion to render a pair of rippled interfacing surfaces. Again, all machining was accomplished prior to the splitting. This technique may be undesirable not only because a high energy electron beam can have a deleterious effect upon material performance, but also because it is considered slower and more costly than previous techniques.

A recent attempt at splitting is disclosed in U S. Pat. No. 4,569,109, which suggests that the rod can be composed of either cast iron, aluminum, or steel that is made brittle by freezing or heat treatment. Such materials can then be fractured by applying tension across a cracking plane while limiting relative movement of the cap and body portions to avoid bending or incomplete fracture (the material having sufficient ductility to provide this risk). Again, this method provides all finish-machining prior to cracking. Disadvantages peculiar to this technique are: (a) To avoid freezing or unnecessary heat treatment, cast iron or aluminum must be used that does not provide adequate tensile strength for a given size; thus, a more massive rod is necessary to achieve higher strengths, which is counterproductive both to fracturing at room temperature and to a better balanced rod. (b) Because all shaping or machining must be carried out prior to cracking, the technique suffers from association with wrought materials. (c) Separate machining must be provided to make the rod sensitive to cracking. (d) Marginally ductile materials cannot always be cleanly cracked. (e) Crack-initiating notches in the crank bore wall provide inadequate support for insertion of a bearing member.

There are also certain disadvantages common to all of the prior art splitting techniques: (a) the bolts, when assembled into both the cap and body portions of a split rod, are retained loosely in place until final assembly, subject to being unintentionally unscrewed and misplaced and thereby permitting mix-up of mating parts; (b) the clearance between each bolt shank and bolt opening is not controlled sufficiently to provide an adequate guide to remating the cap and body portions at identically their exact separation location; (c) some slight distortion in the roundness of the bore opening in the cap and body portions may accompany room temperature splitting by tension and is not compensated during reassembly thereby detracting from the accuracy of the final assembly; and (d) the need to machine locking notches in the internal surface of the bore opening wall while the cap and body are separated.

SUMMARY OF THE INVENTION

The invention is a method and apparatus for making an improved connecting rod that is particularly useful for the demanding conditions of improved compact automotive engines having higher power. The invention, in its several aspects, also overcomes the disadvantages listed above.

The method of this invention, in a first generic aspect, comprises making a connecting rod for attachment to a bearing journal by separation of parts of the connecting rod, comprising the steps of: (a) forging a powder metal sintered preform to provide a one-piece connecting rod having an annular wall defining a crank opening with a center axis and with integral or subsequently machined stress risers for establishing a cracking plane that extends across the crank opening; (b) providing access for a compression coupling across the cracking plane; (c) while at ambient conditions, applying tension substantially uniformly across the cracking plane to propogate fracture from the stress risers along the cracking plane and thereby separate the rod into a cap and body with cracked surfaces; and (d) remating the cap and body by applying a compression coupling through the access to draw the cap and body together under guidance and under yielding pressure to effect substantially an exact rematch of the cracked surfaces.

The stress risers may be crack-initiating crevices, preferably provided by preformed indentations in the annular wall at opposite sides of the crank opening and extending substantially parallel to the center axis. Alternatively, the stress risers are provided by at least two machined grooves at opposite sides of the inner bore wall again extending substantially parallel to the center axis. Cracking can be carried out by use of an expandable mandrel in the crank bore opening to internally create tension or by use of a device to continuously pull the rod apart externally creating tension. Guidance in step (d) is preferably carried out by controlling the diametrical tolerance of the compression coupling and its access opening to 0.006–0.014 inches; the draw of such coupling is carried out with a force substantially up to the yield point of the metal comprising the compression coupling.

Preferably, the forged powder metal one-piece rod has a sharpy V-notch test value of 10–15 ft/lbs at 70° F. and a hardness of 30–40 $R_c$. More preferably, the powder metal rod has tensile test properties of 130–140 ksi, a yield strength of 100–115 ksi, elongation of 10–15%, and a reduction of area at the yield point of 30–40%.

As a second method aspect of this invention, the method is more specific with respect to how the stress risers are created and how cracking by tension is carried out. Specifically, the stress risers (for establishing a cracking plane) are defined independently of the forging step, and the fracturing step is carried out to continuously pull apart the single-piece connecting rod in a direction perpendicular to the cracking plane and with no limit on relative separation movement along the direction of pulling. With reference to the direction of pulling, the cap portion may be held stationary and only the body portion pulled along such direction; alternatively, the body portion may be held stationary and the cap portion pulled away. More preferably, the cap portion is made substantially square to the direction of pulling by stops limiting skewing deviation and the body portion is maintained square to the pulling direction by securing the pin end of the body portion to a slidable support and sliding such support along a track parallel to the pulling direction. Advantageously, for automotive connecting rods, the ratio of the mass (in grams) of the rod to the cross-sectional cracking plane area (in square inches) of the rod is in the range of about 400 to 800.

A third method aspect of this invention is more specific as to how the split portions are guided during remating and employs a unique mode for making lock notches in the internal crank bore wall. Specifically, a mock journal is used to guide the application of compression forces, and full radius bearing locking notches are provided at each diametrical side of the annular wall extending across the cracking plane with each notch having a curvilinear radial extremity throughout its length.

The apparatus aspect of this invention comprises: (a) a member for holding one internal side of a bearing generally stationary, the one side being on one side of an intended cracking plane; and (b) means for continuously pulling a second internal side of the bearing away from the first side in a direction perpendicular to the cracking plane while the second internal side is held substantially square to the direction of pulling.

This invention also considers the resulting bipartite connecting rod an inventive improvement, characterized by: (a) a body and cap, each consisting of densified powder metal fractured from a unitary hot forged powder metal preform of substantially net shape, the body and cap being remated at substantially the exact rematch of the fracture surfaces and secured in such rematched position by threaded compression fasteners extending across the cracking plane; (b) clean cracked surfaces extending along the cracking plane with little or no raised lips or edges deviating therefrom; (c) improved bore tolerances to 0.0004 inches or less; and (d) a mass/cross-sectional cracking area ratio of 400–800.

SUMMARY OF THE DRAWINGS

FIGS. 2 (A–C) are schematic flow diagrams of the different method aspects of this invention;

FIG. 4 is a side elevational view taken along line 4—4 of FIG. 3;

FIG. 5 is a fragmentary perspective view of a portion of the cap of the connecting rod showing the fractured surface thereon;

FIG. 5a is an enlarged side view of the fractured surfaces of both the cap and body;

FIG. 6 is an enlarged exploded perspective view of a portion of the large end of the connecting rod and a fastener used to apply compression forces between the cap and body;

FIG. 6a is an enlarged sectional view of a portion of the fastener inserted into the fastener opening of the rod in FIG. 6, and additionally shows an interference-fit ferrule in position;

FIGS. 7 and 8 are, respectively, side elevational and perspective views of a device used to guide and draw the split cap and body portions together about a mock bearing journal;

FIG. 9 is a side elevational view, partly broken away, to illustrate lock notches in the crank bore opening;

FIG. 9a is an enlarged sectional view taken substantially along line 9a—9a of FIG. 9;

FIG. 10 is a front elevational view of a connecting rod processed in accordance with this invention and shown as assembled with a crank arm bearing therein;

FIG. 11 is a schematic perspective view of a pulling apparatus useful in carrying out the method aspect 2B;

FIG. 12 is a sectional view taken along line 12—12 of FIG. 11; and

DETAILED DESCRIPTION AND BEST MODE

Powder Metal One Piece Rod

Figure 1:
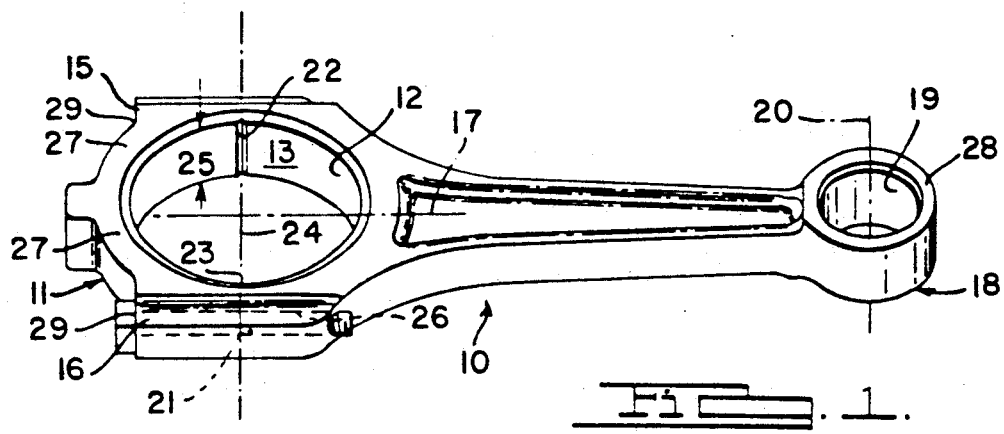
FIG. 1 is a perspective view of a forged one-piece powder metal connecting rod which is to be fractured according to this invention.

Common to all the method aspects of this invention is the use of a powder metal sintered preform which is hot formed to near net shape of a connecting rod. By the mechanism of controlled sintering of alloyed metal powder, followed by controlled cooling, a connecting rod can be formed which possesses desirable notch sensitivity so that it can be split with a desirable fracture pattern that ensures improved remating. For powder steel connecting rods, a sharpy V-notch value of 5-10 ft/lbs at 70° F., along with a hardness of 15-27 $R_c$ (75-88 $R_G$) is desirable. Such notch sensitive steel material can be attained even though the connecting rod will have tensile test physical characteristics which may include an ultimate tensile strength of 120-140 ksi, a yield strength of 80-100 ksi, an elongation of 10-15%, and a reduction of area at yield of 20-30%.

For powder aluminum alloy connecting rods, the sharpy V-notch value will be slightly lower than that of powdered steel at 70° F.; such notch sensitive aluminum alloy material can be attained even though the other physical properties are enhanced by fiber reinforcement in other regions of the rod.

To this end, a steel powder metal net shape connecting rod is formed by the following steps: (a) admixing (percent by weight of the admixture) a ferrous powder with 0.4-0.8% graphite and 1.5-2.5% copper, the admixture should contain no more than 1.5% impurities and should have an average particle size of about −200 mesh; (b) the admixture is compacted under sufficient force to define a preform having a density and configuration to facilitate handling and subsequent hot forming into a desired shape; (c) the preform is sintered in a low oxygen potential atmosphere (as low as 80 ppm) at a temperature of at least 20°-50° F. (preferably 2350° F.) (1287.8° C.) for about 10-15 minutes; the low oxygen potential atmosphere may be obtained by using a dry hydrogen atmosphere, dissociated ammonia or nitrogen/hydrogen mixtures dried by using molecular sieves; (d) hot forming the sintered preform at a temperature of about 1800°-1900° F. under pressure of 50-100 tons per square inch to define a forged shape having a density in excess of 99% (about 7.82 grams/cm³ minimum); and (e) controllably cooling the hot formed preform to form a ferrite-pearlite microstructure; this can be carried out by allowing it to cool in the furnace to a temperature of 1700° F., and thereafter in aqueous solution or air to ensure avoidance of carbides but also avoidance of too soft a material.

The ferrous powder may be a water-atomized soft iron powder; the admixture may contain not only copper and graphite, but also manganese sulfide, and a wax lubricant added to facilitate ejection of the compressed powder admixture from the die. The final composition of the sintered metal may be about 0.5% C, 2% Cu, 0.1% S, 0.7% Mn, and the balance Fe.

Alloying ingredients may be employed in the iron powder admixture. Some of such alloying variations are more fully described in U.S. Pat. No. 4,069,044, assigned to the assignee of this invention, and the disclosure of which is incorporated herein by reference. But such alloying agents must be moderated to ensure a powder metal of a reduced sharpy V-notch value to achieve brittle fracture.

The density of the preform is preferably 6.5 grams/cm³ which is about 82% of theoretical density of steel, the remaining 18% consisting of wax lubricant and porosity. The wax is removed by vaporization during the early heating of step (c) which is carried out in a rotary hearth furnace. In the forging step, the sintered preform is preferably densified with one blow of the press having a prelubricated and preheated die cavity. If needed, the hot formed rods are deburred to remove flask and double disk ground to meet dimensional thickness specifications.

Generic Method Mode

As shown in FIG. 2A, a first or generic method mode broadly comprises: (a) forging a powder metal connecting rod with stress risers for establishing a cracking plane; (b) providing access for a compression coupling across the cracking plane; (c) cracking the connecting rod by tension along the cracking plane; and (d) remating the split portions under guidance and under yielding pressure. Implied steps which are not part of the essential steps of mode A, but which are used to make the rod, comprise: (e) finish-machining of the mated rod, and (f) assembly of the finish-machined rod onto a shaft with a bearing assembly.

To carry out step (a), the powder metallurgy techniques above-described are utilized. As shown in FIG. 1, the hot formed preform provides a connecting rod 10 having a big end 11 adapted for holding a crank arm and bearing assembly in a crank opening 12 defined by annular cylindrical wall 13 having a center axis 14. The rod 10 has shoulders 15 and 16 respectively at opposite sides of the rod (taken with respect to a longitudinal axis 17 of the rod). At the small end 18, a cylindrical bearing wall 19 is provided to receive a pin bearing along a center axis 20. The shoulders 15 and 16 are designed with sufficient mass to accommodate fastener openings 21 in each side and have an axis oriented to be parallel with the axis 17.

Stress risers 22 and 23 are incorporated into the preform to establish a cracking plane 24. The stress risers permit initiation of fracture and propogation of the crack across the weakest plane of the material perpendicular to the direction of tension. Such stress risers may be crevices on the wall 13 which extend parallel to the bore axis 14 of bore opening 12 and extend throughout the thickness 25 of the rod (longitudinal extent of opening 12). Such crevices may preferably be incorporated as an open groove or fold in the hot forming stage when making the near net shape preform, and such hot formed groove or fold may be further machined or broached to have sharply converging walls with an included angle of 70°-100°. Alternatively, such stress risers may be initially formed by machining or broaching sharp grooves in the unmachined or rough-machined wall 13; such crevices or grooves should desirably have a sharp convergence of walls and a depth of about 0.030 inches so that upon application of tension to the inside of the bore opening and across the cracking plane, the crack will propogate sideways along such plane 24.

For purposes of step (b), the openings 21 constitute an access for threaded fasteners which together with the rod serve as a compression coupling (see FIGS. 1 and 6). These openings are drilled into the shoulders 15 and 16 across the cracking plane 24. The portion of each opening 21, that resides on the side of plane 24 opposite from where the drill enters the rod, is tapped to provide threads 26. The other portion of the opening 21 is unthreaded and preferably is designed to maintain a diametrical clearance of about 0.001 inch with the bold shank that extends therethrough.

Prior to the cracking step, the one-piece rod is not only drilled and tapped to provide the access, but may also have (i) crank opening wall 13 and pin opening wall 19 rough-machined, (ii) thrust surfaces 27 (on opposite sides of the rod and about the crank opening 12) ground to provide perpendicular thrust faces with respect to axis 14, (iii) thrust surfaces 28 (on opposite sides about pin wall 19) ground to provide thrust faces perpendicular to axis 20, and (iv) bolt head seats 29 machined or spot faced to provide accurate surfaces perpendicular to the axes of the cylindrical openings 21 (which are parallel to axis 17) and parallel to the axis 14.

Figure 3:
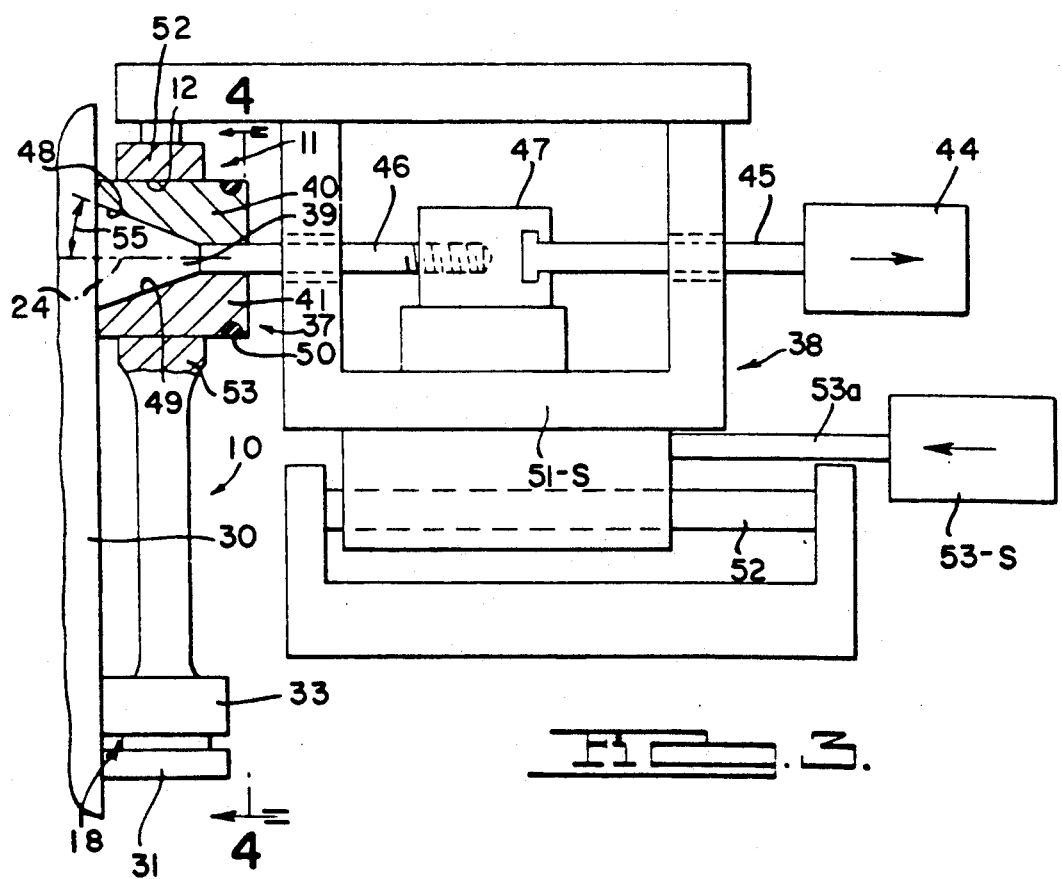
FIG. 3 is an elevational view, partly in section, of an apparatus useful in carrying out the method aspect of FIG. 2A.
Figure 13:
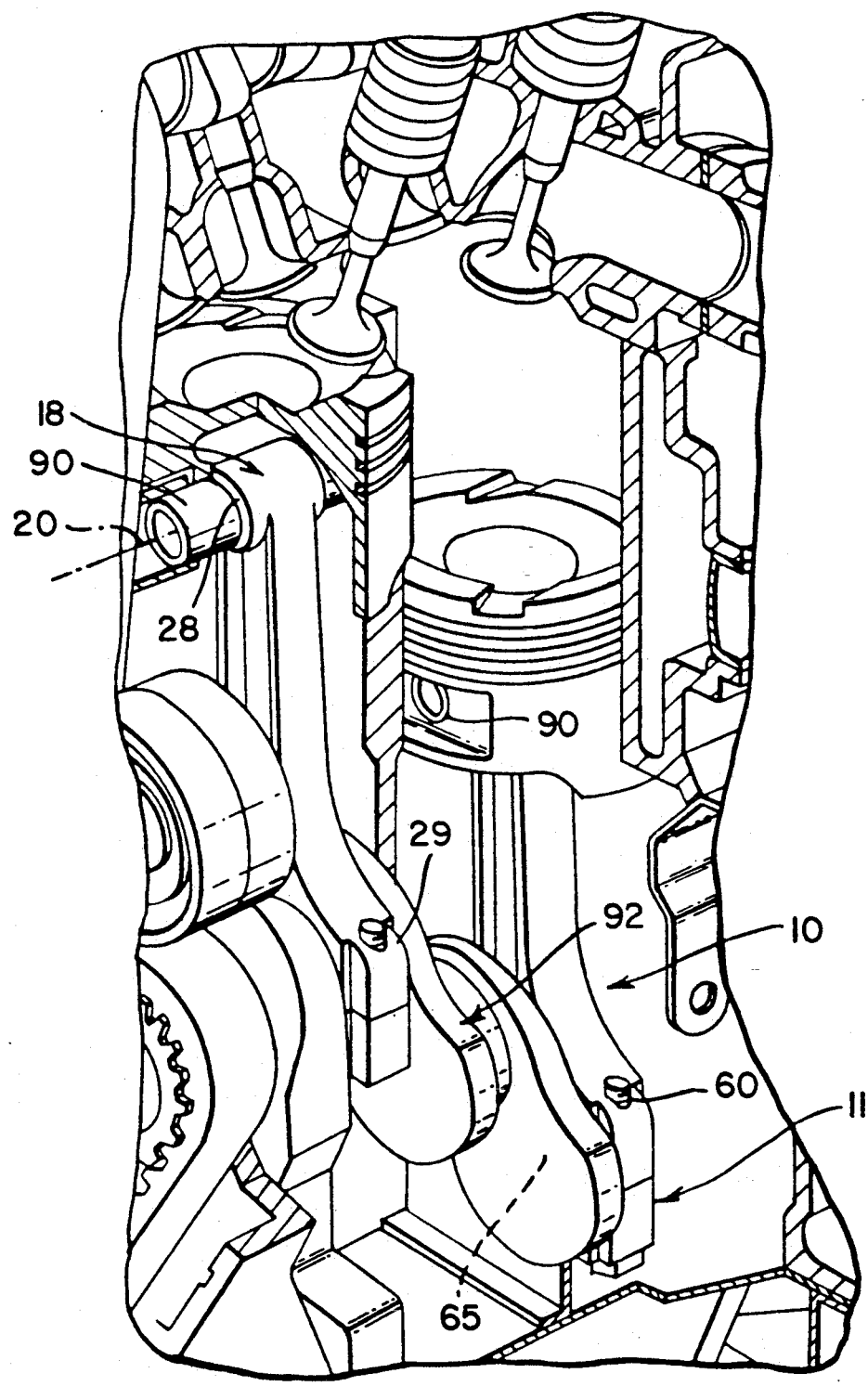
FIG. 13 is a perspective view of the connecting rods, made by this invention, assembled in an automotive engine.

Step (c) is carried out to create tension across the cracking plane by applying an expanding pressure to the inside of the crank opening wall 13. To this end, and as shown in FIGS. 3 and 4, the one-piece connecting rod is loosely supported in a vertical position against a web 30 having dowels 31 and 32 projecting outwardly to seat the small end 18 of the rod, and blocks 35 and 36 extend outwardly to loosely cradle the sides of the big end 11 while blocks 33 and 34 extend outwardly to loosely cradle the sides of the small end 18.

An expandable mandrel 37, carried by a slide apparatus 38, is inserted into the crank opening 12 of the supported connecting rod. The mandrel has two oppositely acting members 40 and 41, each respectively provided with a hemisperical-like surface 42,43 which can engage only that portion of the wall 13 which lies on one side of the cracking plane 24. The wedge 39 is interposed between the members 40 and 41, and when pulled to the right (by an actuating cylinder 44 operating through a shaft 45 attached to an extension 46 of the wedge 39 via a coupling 47), the wedge 39 will cam mating surfaces 48 and 49 of such members radially outwardly and perpendicular to the cracking plane 24. The members are loosely restrained about the wedge 39 by collar 50 which does not inhibit expansion for cracking.

The slide apparatus 38 supports the wedge connection of extension 46, shaft 45 and coupling 47 in a slide carriage 51; the carriage in turn is slidably supported on a pair of rails 52-5. An actuator 53-5 is employed to move the slide apparatus to the left via a rod 53a for positioning of the mandrel 37 in the rod opening 12. When the insertion is completed, the actuator 44 can then draw the wedge 39 to the right to burst the rod apart into a cap 52 and body 53.

If the mandrel is accurately mated to the connecting rod and the camming angle 55 is sufficiently gradual (in the range of 10°-25° taken with reference to the cracking plane 24), the connecting rod will have fractured surfaces 56 and 57 at each side of the rod (one such surface is shown in FIG. 5). Such surfaces will be characterized by unique raggedness (equivalent to unique fingerprints) that results from microyielding deformations or peaks 58 as shown in FIG. 5a.

Step (d) involves remating the split portions (cap 52 and body 53) with an exact identity of the unique fracture raggedness (or fingerprints) as shown in FIG. 5a. Two things are employed to accomplish this: the threaded fasteners 60 are inserted into the fastener openings 21 to draw the cap 52 and body 53 together (see FIG. 6). Micromisalignment of the cap and body is avoided by control of the diametrical clearance between the shank 60a of each bolt and the unthreaded portion of opening 21, such as within 0.006-0.014 inches.

It is advantageous that the fastener 60 (i.e., steel alloy (Class 8) bolts) be stressed (by turning with high torque against the threads 54 of the opening) up to the yield point of the steel material of the bolt shank. The yield point of peaks 58 of the ragged fracture will be lower than the yield point of the alloy steel bolt 60. It is important that microalignment of the cap and body be provided because any mating peaks and valleys not realigned will undergo some ductile deformation while the cap and body are compressed together. This facilitates mating but reduces interlocking effect between the peaks of the mating surfaces. Any micromisalignment can further be obviated by use of a mock journal guide 67 (see FIGS. 7 and 8), and any out-of-roundness of the wall 13 of the cap and body will also be restored during such remating step. The mock journal is inserted into the crank opening 12 with the diametrical clearance between the mock journal outer surface 67a and internal crank opening wall being about 0.0006 inches or less. The mock journal should be the substantial equivalent of the combination of the bearing sleeve 64 and crank arm 65 which is to be inserted and received by the connecting rod big end. Advantageously, such mock journal may be supported on an upright stand 62 and coupled thereto by fasteners 63. The support orients the mock journal to be square to the axes 14 and 17 of the connecting rod.

This completes the essential steps of this method mode, but the additional step (e) of finish-machining of the mated rod portions may be carried out. Such machining is accomplished (i) at the crank bore opening 12 to remove material to a depth of about 0.017 inches, which may be about 60-75% of the depth of any crevice in the wall 13; (ii) at the thrust surfaces 27 by a light grinding to remove material only to a depth of about 0.005 inches; and (iii) at locations for milling of locking notches as will be described in connection with method mode 2C.

A conventional step (f) would involve unloosening the bolts to a degree permitting separation of the cap and body necessary to allow the insertion of the half shell bearings into each part of the connecting rod and the assembly of such body and cap about the right crank arm of an automotive crankshaft 92. To facilitate retention of the bolts 60 to the cap of the connecting rod, interference-fitting bands 69 or ferrules may be slipped onto the shank of each bolt prior to formation of threads on each bolt; when the bolt is fully threaded into opening 21, the bolt head 60b will force the band or ferrule into place as an interference fit (as shown in FIG. 6a). Thus, even when bolts 60 are fully unthreaded from body 53, the band 69 will not permit the threaded portion of each fastener to pass through such band and thereby will be retained to cap 52. Thus, loss of bolts during attachment to the crankshaft is avoided and automation of such assembly is facilitated by such bolt and cap assembly.

Method Mode 2B

This mode additionally provides for definition of stress risers independently of step (a). This may be accomplished by machining or broaching sharp grooves into the rough-machined surface of crank bore opening 12, such grooves extending parallel to the axis 14 and preferably to a depth of about 0.030 inches. Again, the converging of such grooves should be sharp and have an included angle therebetween of 70°–100°. The machining for this substep (a-1) should be either in the rough-machined bore surface or in the virgin wall itself prior to rough-machining.

This method mode also distinguishes from the generic mode by a particular and improved manner of applying tension in step (c). This mode continuously pulls apart the connecting rod in a direction perpendicular to the cracking plane with no limit on relative separation movement along the direction of pulling. This may be carried out by the apparatus as shown in FIGS. 11 and 12. A pair of plates 70 and 71 are rigidly, but removably, provided to secure a hemisperical-like block 72 therebetween by use of a plurality of dowels 73 extending through the plates and block. Slide plates 74,75 similarly secure a hemisperical-like block 76 (in opposed position to block 72) by dowels 77. However, a pin 78 (having a diameter commensurate with the internal diameter of the pin opening wall 19 of the small end 18 of the connecting rod) is rigidly held by the plates 74,75 and is received in the small end of the rod to permit the slide plates 74,75 to pull the small end of the connecting rod. The pulling force is provided by an actuator 79 and is oriented to provide a pulling force that is perpendicular to the cracking plane 24 as aided by tracks 85 on a bed 86 guiding the sliding motion of plates 74,75 by complementary rails 87.

Tension created by tracked continuous separation movement provides an ability to crack marginally ductile connecting rods without evidence of distortion. However, it is desirable that the hardness of the powder metal rod be maintained in the high end of the preferred range to enhance consistency of cracking.

The roundness of the crank bore opening will quite unexpectedly be better retained with little or no evidence of distortion. Any out-of-roundness will be removed by finish-machining, but with increased efficiency due to accuracy of the opening. The cracked plane will be devoid of raised lips or ridges which can be a product liability problem if such lips are knocked loose in operation and enter the lubrication system.

Method Mode 2C

This mode provides for mock journal guiding during remating and full radius bearing locking notches. Step (d) remates the split bearing portions (cap 52 and body 53) guided by a mock journal 61, using compression forces (applied by threaded fasteners 60 in threaded openings 21). Step (e) is divided into two stages, the first of which is to machine the crank bore wall 13 to finish dimensions which removes some portion of the stress risers 22 and 23. As shown in FIGS. 9, 9a, and 10, the second stage of (e) is to provide one or more locking notches 80 in the finish-machined wall 13, which notches extend across the cracking plane 24 and have a curved radial extremity 81 throughout. The notches 80 may be created by milling grooves with a rotary cutting tool that has a cutting radius substantially less than the radius of the wall 13. The grooves may have a rectangular cross-section defined by a width 82 of about 0.25 inches and a groove bottom (radial extremity 81) that extends a distance 99 (0.5–1 inches) to either side of the cracking plane 24. These notches provide a sharp shouldered space into which tangs 83 and 84 of half round or shell bearing sleeves 64 may radially extend thereinto. Such half shell bearing sleeves are locked against axial displacement, taken with respect to axis 14, provided the tangs fit snugly into the width of such grooves.

Step (f) comprises the assembly of the cracked connecting rod onto a shaft 65 (i.e., crank arm of an automotive crankshaft 92) with the half shells of the bearing sleeve 64 interposed therebetween. Such bearing sleeve can be comprised of laminated bronze powder metal coated with a babitt-type material. The half shells are shrunk-fit to the crank bore opening wall 13 and aligned so that the shells separate with the cap and body respectively during assembly onto the shaft 65.

The resulting bipartite connecting rod is characterized by: (a) a body and cap, each consisting of densified powder metal fractured from a unitary hot forged powder metal preform of substantially net shape, the body and cap being remated at substantially the exact rematch of the fracture surfaces and secured in such rematched position by threaded compression fasteners extending across the cracking plane; (b) clean, cracked surfaces extending along the cracking plane with little or no raised lips or edges deviating therefrom; (c) improved bore tolerances to 0.0004 inches or less; and (d) a mass/cross-sectional cracking area ratio of 400–800.

The apparatus aspect of this invention comprises: (a) a member for holding one internal side of a bearing generally stationary, the one side being on one side of an intended cracking plane; and (b) means for continuously pulling a second internal side of the bearing away from the first side in a direction perpendicular to the cracking plane while the second internal side is held substantially square to the direction of pulling.

While particular embodiments of the invention have been illustrated and described, it will be obvious to those skilled in the art that various changes and modifications may be made without departing from the invention, and it is intended to cover in the appended claims all such changes and modifications as fall within the true spirit and scope of the invention.

We claim:

1. In a method of completing the making of a connecting rod bifurcated by fracture, said rod having fractured portions with mating cracked surfaces carrying complementary peaks and valleys, said rod having an annular internal wall, the steps comprising:
    (a) assembling said rod portions together to substantially remate the peaks and valleys of said cracked surfaces by guided application of compression forces;
    (b) machining said annular wall to final finished dimensions in said remated condition; and
    (c) providing notches at each diametrical side of said annular wall extending across said cracking plane, each notch having a curvilinear radial extremity throughout its length.

2. The method as in claim 1, in which one pair of said notches is employed, each notch having a length generally parallel to the other and a width commensurate with the width of said internal wall.

3. The method as in claim 1, in which said notches have a cross-section which is generally rectangular.

4. The method as in claim 1, in which in step (a) said guided application of compression forces is carried out by rebolting the portions together under a torque that stresses up to the yield point of the bolt material.

5. The method as in claim 4, in which said guided application of step (a) uses a mock journal fitting within said internal wall.

6. A method of reassembling bifurcated portions of a connecting rod divided by fracture across an annular internal wall thereof and at preformed crevices therein, said portions having mating cracked surfaces with complementary peaks and valleys, comprising the steps of:

(a) reassembling said bifurcated portions to substantially remate the peaks and valleys of said cracked surfaces by bolting said portions together about a removable journal, said journal providing a diametrical clearance with said bifurcated portions prior to bolting of about 0.0006 inches or less;

(b) after removing said journal, machining said annular internal wall to a depth of no greater than 75% of the depth of said crevices;

(c) machining notches at opposed diametrical sides of said wall extending across said cracking plane, each notch having a curvilinear radial extremity throughout its length; and (d) inserting bearing shells conformable to the slope of said internal wall, said shells each having a tang to seat within a notch for locking retention of said shells.

* * * * *